US012664206B2

(12) United States Patent
Shirbhate et al.

(10) Patent No.: US 12,664,206 B2
(45) Date of Patent: Jun. 23, 2026

(54) AUTOMATICALLY ENHANCING STREAMING MEDIA USING CONTENT TRANSFORMATION

(71) Applicant: Google LLC, Mountain View, CA (US)

(72) Inventors: Akhilesh Shirbhate, Sunnyvale, CA (US); Ariyam Das, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 305 days.

(21) Appl. No.: 17/616,866

(22) PCT Filed: Dec. 17, 2020

(86) PCT No.: PCT/US2020/065559
§ 371 (c)(1),
(2) Date: Dec. 6, 2021

(87) PCT Pub. No.: WO2022/132151
PCT Pub. Date: Jun. 23, 2022

(65) Prior Publication Data
US 2022/0398276 A1     Dec. 15, 2022

(51) Int. Cl.
*G06F 16/432* (2019.01)
*G06F 16/483* (2019.01)

(52) U.S. Cl.
CPC .......... *G06F 16/433* (2019.01); *G06F 16/483* (2019.01)

(58) Field of Classification Search
CPC .............................. G06F 16/433; G06F 16/483
See application file for complete search history.

(56) References Cited

U.S. PATENT DOCUMENTS 10,847,149 B1 * 11/2020 Mok ....................... G10L 15/22
2009/0204243 A1     8/2009 Marwaha et al.
(Continued)

FOREIGN PATENT DOCUMENTS

| CN | 105488094 | 4/2016 |
| CN | 109716327 | 5/2019 |
| EP | 3335096 | 6/2018 |
| GB | 2486038 | 6/2012 |
| WO | 2017/124116 | 7/2017 |

OTHER PUBLICATIONS

Haijun Xia, Jennifer Jacobs, Manesh Agrawala, "Crosscast: Adding Visuals to Audio Travel Podcasts", Proceedings of the 33rd annual ACM Symposium on User Interface Software and Technology, Oct. 20-23, Virtual Event, USA (Year: 2020).*
(Continued)

*Primary Examiner* — Sherief Badawi
*Assistant Examiner* — Earl Levi Elias
(74) *Attorney, Agent, or Firm* — Fish & Richardson P.C.

(57) ABSTRACT

A method includes receiving media content comprising audio data for distribution through content distribution platform that requires the media content to include video content, transforming the audio data into textual content, determining, based on a search of a searchable database, that the textual content of the audio data matches characteristics of visual data in the searchable database, integrating the visual data having the matched characteristics with the media content to create an augmented content stream in response to the determination that the textual content of the audio data matches the characteristics of the visual data, and distributing the augmented content stream through the content distribution platform that requires the media content to include video content.

21 Claims, 5 Drawing Sheets

(56) References Cited

U.S. PATENT DOCUMENTS

| | | | |
|---|---|---|---|
| 2015/0339396 A1* | 11/2015 | Ayers .................. | G06Q 10/101 |
| | | | 707/734 |
| 2017/0075652 A1* | 3/2017 | Kikugawa ............... | G10L 21/12 |
| 2020/0159487 A1* | 5/2020 | Dawson .................... | G06F 3/16 |
| 2020/0321005 A1 | 10/2020 | Iyer et al. | |
| 2020/0357442 A1* | 11/2020 | Denoue ............... | G11B 27/031 |

OTHER PUBLICATIONS

International Search Report and Written Opinion in International Appln. No. PCT/US2020/065559, dated Jul. 16, 2021, 15 pages.
Office Action in European Appln. No. 20842427.5, dated Sep. 2, 2022, 6 pages.
Xia et al., "Crosscast: Adding Visuals to Audio Travel Podcasts," Proceedings of the 33rd annual ACM Symposium on User Interface Software and Technology, Oct. 20, 2020, 735-746.
International Preliminary Report on Patentability in International Appln. No. PCT/US2020/065559, mailed on Jun. 29, 2023, 9 pages.
Summons to Attend Oral Proceedings in European Appln. No. 20842427.5, mailed on Sep. 29, 2023, 10 pages.
Office Action in European Appln. No. 20842427.5, mailed on Apr. 3, 2024, 18 pages.
Office Action in Indian Appln. No. 202127056820, mailed on Sep. 2, 2024, 8 pages (with English translation).
Office Action in Chinese Appln. No. 202080046312.X, mailed on Oct. 31, 2024, 12 pages (with English translation).
Office Action in Indian Appln. No. 202127056820, mailed on Oct. 31, 2025, 4 pages (with English translation).

* cited by examiner

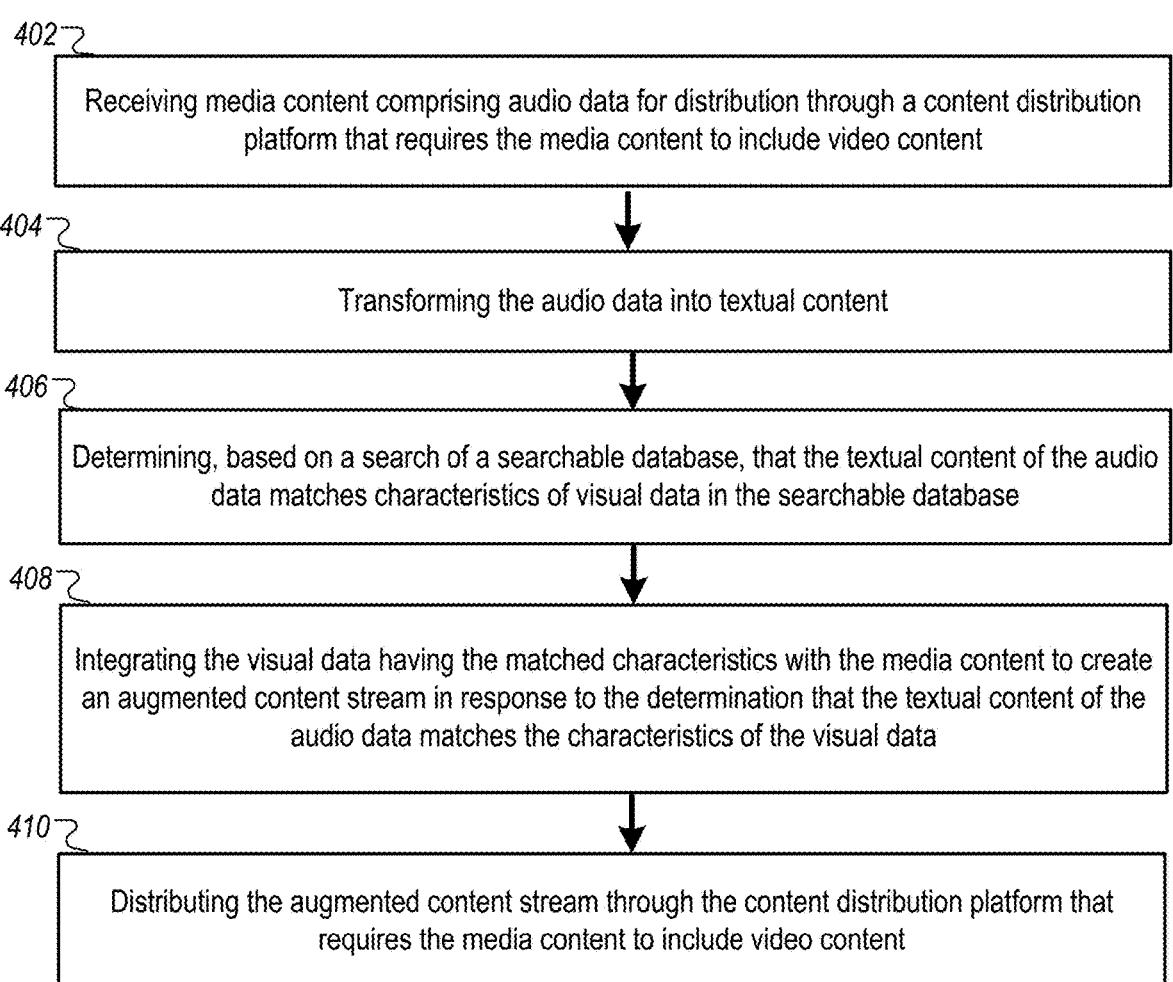

*400*

*402*

Receiving media content comprising audio data for distribution through a content distribution platform that requires the media content to include video content

*404*

Transforming the audio data into textual content

*406*

Determining, based on a search of a searchable database, that the textual content of the audio data matches characteristics of visual data in the searchable database

*408*

Integrating the visual data having the matched characteristics with the media content to create an augmented content stream in response to the determination that the textual content of the audio data matches the characteristics of the visual data

*410*

Distributing the augmented content stream through the content distribution platform that requires the media content to include video content

FIG. 4

AUTOMATICALLY ENHANCING STREAMING MEDIA USING CONTENT TRANSFORMATION

CROSS-REFERENCE TO RELATED APPLICATION

This application is a National Stage Application under 35 U.S.C. § 371 and claims the benefit of International Application No. PCT/US2020/065559, filed Dec. 17, 2020. The disclosure of the foregoing application is hereby incorporated by reference in its entirety.

BACKGROUND

This specification relates to data processing, transforming data from streaming media to detect features of the streaming media, and matching the detected features to other media.

Media is distributed in a variety of ways. For example, some media is streamed by streaming device, and that media can include audio, video, or a combination of audio and video. Some streaming services require that media include certain types of content in order to be distributed by the streaming service platform.

SUMMARY

In general, one innovative aspect of the subject matter described in this specification can be embodied in a method that includes receiving media content comprising audio data for distribution through content distribution platform that requires the media content to include video content, transforming the audio data into textual content, determining, based on a search of a searchable database, that the textual content of the audio data matches characteristics of visual data in the searchable database, integrating the visual data having the matched characteristics with the media content to create an augmented content stream in response to the determination that the textual content of the audio data matches the characteristics of the visual data, and distributing the augmented content stream through the content distribution platform that requires the media content to include video content.

These and other implementations can optionally include one or more of the following features. In some implementations, the method also includes detecting an annotation located at a particular temporal location within the media content, and wherein integrating the visual data with the media content to create the augmented content stream includes overlaying, based on the annotation, the visual data with the media content at the particular temporal location within the media content. In some implementations, the annotation specifies one or more visual data characteristics.

In some implementations, integrating the visual data with the media content to create the augmented content stream further includes editing the visual data based on the one or more visual data characteristics.

In some implementations, the annotation specifies that visual data cannot be overlaid with the media content at the particular temporal location.

In some implementations, the method includes determining a first context of the media content based on the textual content of the audio data, determining a second context of the visual data based on the characteristics of the visual data in the searchable database, and wherein determining that the textual content of the audio data matches characteristics of the visual data in the searchable database comprises determining that the first context matches the second context. In some implementations, the method includes identifying a particular temporal location within the media content based on the first context of the media content, and wherein integrating the visual data with the media content to create the augmented content stream comprises overlaying the visual data with the media content at the particular temporal location within the media content.

Other embodiments of this aspect include corresponding systems, apparatus, and computer programs, configured to perform the actions of the methods, encoded on computer storage devices.

Content creators are generally limited to providing content the format in which the content was created, which can limit the platforms on which their content can be published and the audiences they can reach. If a content creator generates an audio file, such as a podcast, that podcast (or other audio file) may not be eligible for distribution over platforms that require a visual component (e.g., an image or video aspect). In this situation, the podcast will be blocked from distribution, and potential listeners who are interested in the podcast, not be able to find the podcast using a platform that requires the inclusion of a visual component (e.g., video content).

Media content that users request and consume is generally identified using data in text format and existing systems are tailored to analyze and select additional content for distribution with the media content using text-based characteristic data. Current methods for matching and selecting additional content for media that is not text-based depend on context data (e.g., in the form of text metadata) that is often manually provided by the creator of the additional content. However, text-based systems don't utilize the actual audio/video media content itself to match and/or select media content. This can result in resources being wasted, for example, when the context data that is assigned to content either inaccurately describes the content or fails to provide an adequate description of the content because this can result in distribution of content that is not useful in the context of the media content being streamed. In other words, using text-based analysis of metadata provided by the content creators without analyzing audio or video aspects of the content, can result in an inefficient system that fails to identify content relevant to what a user is seeking. This results in the submission of additional queries, which takes more time and requires additional network calls and can drain a battery of the client device, additional searches of the database, which requires more processing power, and the delivery of additional content to the client device, which utilizes more network bandwidth and consumes client device battery power.

The following description discusses various techniques and systems for improving mechanisms that control whether content is transmitted over a network and the type of content being transmitted over a network by transforming streaming media content into a form that enables using information derived from the streaming media content itself, in addition to or instead of using metadata provided with the streaming media content, to select content for presentation with the streaming media content.

Particular embodiments of the subject matter described in this specification can be implemented to realize one or more of the following advantages. The system can transform streaming media content to include content of a different format or type, thereby making it suitable for analysis by existing systems. Additionally, the system allows non-text content to be used in text matching mechanisms to enable the selection of audio content to be presented to a user with the streaming media content item based on the determination that the non-text content corresponds to the audio content. Further, the techniques enable the transformation of a particular type of media content (e.g., audio content) into a different type of media content (e.g., mixed media, such as audio and video content) so that the media content is capable of distribution over a platform that only distributes content that includes the different type of media (e.g., video distribution platforms). Further, and as would be understood, with mixed media, a larger amount of information is transmissible over the same timeframe compared to non-mixed media.

The techniques discussed herein can enhance the transformation of streaming media content (e.g., audio content, such as a podcast) based on various audio characteristics beyond words spoken within the streaming media content. For example, the techniques discussed herein can differentiate between speakers to prevent semantic drift that may occur if there was no distinction made between the speakers. Additionally, the techniques discussed herein provide improvements over traditional systems by emphasizing transformations of the words spoken in streaming media content (e.g., podcasts) based on audio characteristics other than identification of the speaker. For example, the volume of some words relative to others can be used to embed (or assign) an emphasis (or other indicators of importance) to words detected in the streaming media content, thereby enhancing the information used to select additional content (e.g., digital components) for presentation with the streaming media content. In some situations, the emphasis assigned to a word can be proportional (e.g., directly or inversely proportional) to the volume of that word, a change in pitch relative to other spoken words, or an amount of detected silence surrounding that word. This provides richer information about the audio of the streaming media content that can be input to text matching mechanisms to provide for a more accurate match between the subject matter of the streaming media content and the additional content selected for presentation.

Existing techniques that require manual selection and integration of additional non-textual content into a particular media content item by its creator is time-consuming and limited to the additional content to which the creator has access or knowledge of. By transforming non-textual content into a format that can be processed and matched by text-based systems, the described techniques allow access to a more diverse and comprehensive selection of additional content, as well as improved and more tailored content selection. Additionally, the described system allows for dynamic content that can be updated and tailored to each user's preferences. Because existing infrastructure and systems can be used, the described technique reduces resources required to train and improve the content matching and selection process, and allows the non-textual content system to take advantage of accrued knowledge available to existing systems used for text-based content matching and selection. Furthermore, the described method allows for more narrowly tailored content by analyzing the entirety of the content than would otherwise be possible using only manually entered, user-defined context data provided by a content creator.

The system expands the universe of available content from which the system can choose for distribution to a user by integrating with existing databases of content of different types than the original content. For example, audio content can be matched with an image or video content, and new content can be created from the original content and the matching content. This process provides a simplified method for creating new content or content of a different format. Because the resulting content generated from the original content can be customized on-demand such that the resulting content is dynamically updated/modified based on when the original content is requested or be personalized depending on the profile of the requesting user, many versions of content can be created using the same original input content, which only requires storing a single instance of the original input content. Because only a single instance of the original input content needs to be stored, while enabling the distribution of many different versions, this reduces the overall memory requirements relative to having to store an instance of each separate version. This allows a single content creator to customize and tailor their content to a wider audience without requiring additional memory capacity or web services (e.g., network storage or processing resources). Additionally, the original content can be enhanced with additional content without disrupting the quality of the original content. Thus, the content being generated is dynamic and can be refreshed and personalized each time the original content is requested.

In addition, the use of context to identify and select additional content can prevent distribution of inappropriate content, thereby reducing wasted resources. This method reduces the amount of resources expended distributing content that is inappropriate and should not be distributed and more efficiently provide content across a network—the method prevents the distribution of content to an entity that is not actually consuming (listening to and/or viewing) the content. In other words, the computing resources, such as network bandwidth, processor cycles, and/or allocated memory, are not wasted by using these resources to distribute content that should not be distributed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process of content transformation including matching and selection.

Like reference numbers and designations in the various drawings indicate like elements.

DETAILED DESCRIPTION

Figure 1:
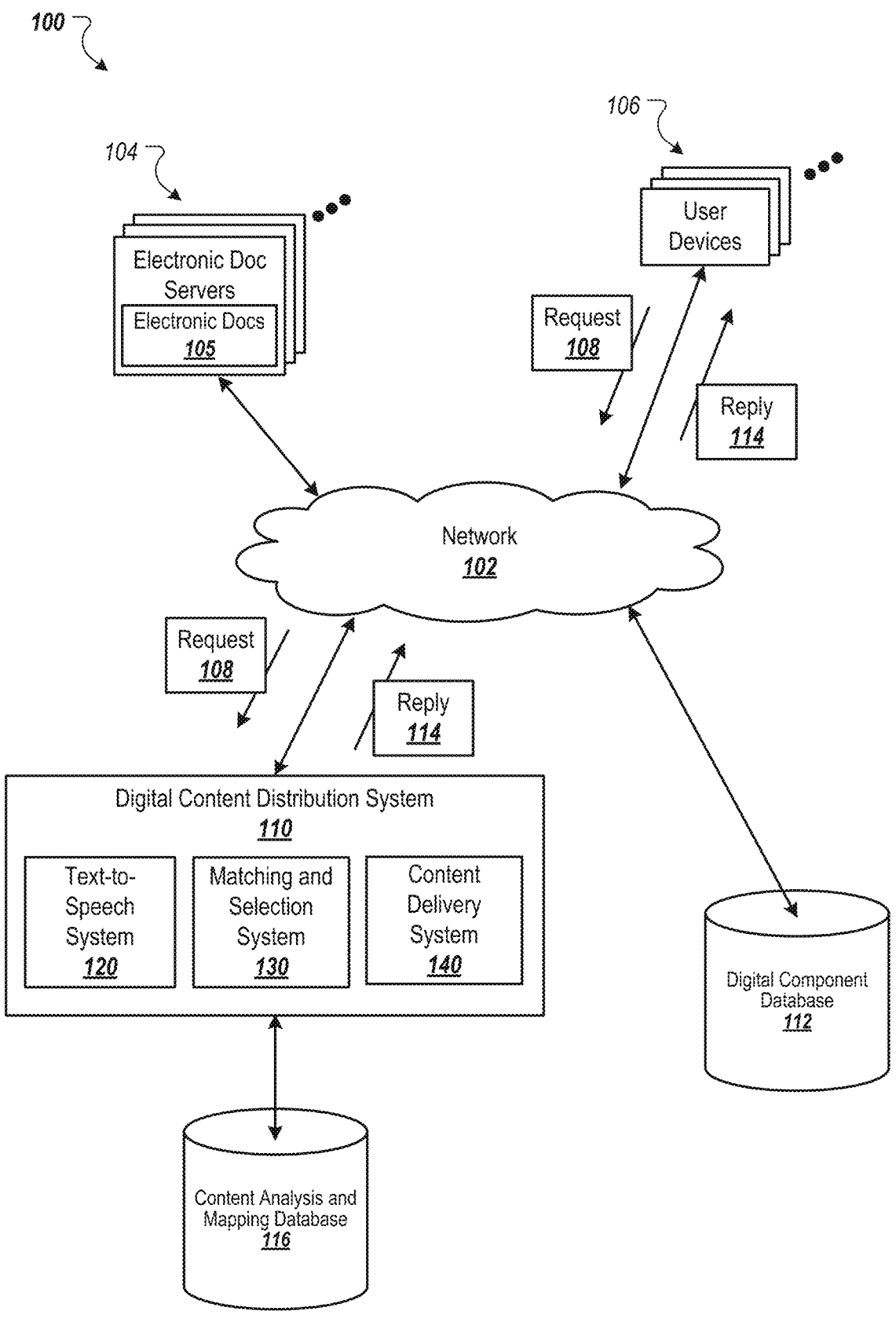
FIG. 1 is a block diagram of an example environment for content transformation.

This document discusses techniques and systems that convert a media item that contains a particular type of media (e.g., audio) into a new media item that includes at least one different type of media (e.g., video). As discussed in detail below, the techniques can transform non-textual content into a form that enables a text-based matching system to select non-textual content for presentation and create content in a new form. For example, as discussed in more detail below, podcasts (e.g., audio programs with a host and often guests) can be analyzed using the techniques discussed herein, and transformations of the audio aspects of the podcast can be created to enable selection of digital components or other content for presentation with and/or insertion into the podcast. In a specific example, video content corresponding to a topic being discussed in a podcast can be selected and combined with the audio content of the podcast to convert the podcast from an audio file into an audio/video file that is capable of being distributed using a video distribution platform that may not distribute audio only content.

In some implementations, the other content and/or digital components that are available for delivery with the original content (collectively referred to as "additional content") are in a non-textual format. A text transcription of the audio of the additional content having audio data or a text description of the additional content having visual data can be stored in a text searchable database. The original content that includes non-textual content is also obtained and transformed into textual content. There are various ways in which the transformation of the non-textual content can be encoded (or emphasized) to reflect various characteristics of the media content. For example, if the original content is audio data, the transformation of the audio data can reflect characteristics of the audio content beyond just the words spoken, as discussed in more detail below. The transformation of the original content is used to search the searchable database to find a match between the original content and the additional content.

The additional content is integrated with the original content to create an augmented content stream, and delivered to a user that has requested the original content. The additional content can be integrated with the original content to create a new stream of content. In some implementations, the additional content is inserted into the original content stream. In some implementations, the additional content is overlaid with the original content stream. The techniques discussed herein can be performed at the time a user requests the original content so that additional information (e.g., user specific information, current event information, or other information) can be used to augment the search of the searchable database at the time the original content is being presented, thereby providing a dynamic media item that can be modified for each individual user and/or based on information that changes over time.

Throughout this document, a user (such as an end user, content generator, or content provider, among other types of users) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 for privacy preserving data collection and analysis. The example environment 100 includes a network 102, such as a local area network (LAN), a wide area network (WAN), the Internet, or a combination thereof. The network 102 connects electronic document servers 104 ("Electronic Doc Servers"), user devices 106, and a digital content distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, gaming systems, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software such as a browser or an operating system. In some implementations, the software allows a user to access information through a network, such as network 102, retrieving information from a server and displaying the information on a display of user device 106. In some implementations, the software manages user device 106's hardware and software resources and provides common services for other programs on user device 106. The software can act as an intermediary between programs and user device 106's hardware.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source. Media content as referred to herein is a type of digital content.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include geographical location, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., display size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. The DCDS 110 can select additional content to be presented with the given electronic document in response to receiving the request 108, defined as follows: content other than the original content and digital components that are available for delivery with the original content.

In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Text-to-speech system 120 is a content transformation system that can transform text content to audio content and audio content to text content. In the context of this description, audio content is not restricted to audio-only content. For example, in some embodiments, audio content can include video content, which can be referred to as multimedia content, and would still be considered audio content for the purposes of this document. Text-to-speech system 120 can perform content transformations using techniques for text-to-speech and speech-to-text transformations. For example, text-to-speech system 120 can transcribe an audio-only file into plaintext. Text-to-speech system 120 can also transform a text-only file into an audio file, which may include a corresponding image file. The output of text-to-speech system 120 can be an audio-only file, a video file having audio and visual data, an image-only file, or a text-only file, among other formats. Text-to-speech system 120 detects words within an audio file and outputs the words, transcribing the content of the audio file. The DCDS 110 stores the results of its analysis in a datastore, such as content analysis and mapping database 116. Content analysis and mapping database 116 stores the relationships between and among content items, content characteristics, entities, and events, among other types of data.

Matching and selection system 130 performs the content matching and selection process for DCDS 110. For example, matching and selection system 130 can perform analysis of the output of text-to-speech system 120 or any received content to determine particular characteristics of the content itself, such as a topic or category of content, entities mentioned or suggested by the content, and/or the frequency with which a topic or entity is mentioned, among other characteristics. Matching and selection system 130 can also perform analysis to determine characteristics of the audio data, such as volume, emphasis, tone, among other characteristics. For example, matching and selection system 130 can determine a topic or intent for media content.

Matching and selection system 130 can be implemented as two separate systems. In some implementations, matching and selection system 130 can perform matching and selection separately for other content, such as image or video data to be overlaid with the original content, and for a digital component, such as a link to a relevant website to be inserted into the content or into composite content created using the original content and the other content.

For example, the subsystem of matching and selection system 130 that performs the matching and selection for other content can operate independently of, and have different selection and matching algorithms and criteria from the subsystem of matching and selection system 130 that performs the matching and selection for digital components. In some implementations, the requests for the other content and the requests for digital components can be sent as separate requests to the separate subsystems. The separate subsystems of matching and selection system 130 can each return a response with a winning candidate content item (either of other content or a digital component) based on their own selection process.

Matching and selection system 130 can use the transformed media content as input to a content or digital component selection process. For example, matching and selection system 130 can perform a content selection auction according to existing techniques and using the transformed media content as input.

Matching and selection system 130 can perform content matching, by matching the characteristics of the content and of the content file itself, for example, using artificial intelligence and machine learning techniques to perform the matching.

Matching and selection system 130 can use statistical and/or machine learning models that accept user-provided information and media content as inputs. The machine learning models may use any of a variety of models such as decision trees, generative adversarial network-based models, deep learning models, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning models may use supervised learning. In some examples, the machine learning models use unsupervised learning.

Content delivery system 140 performs content packaging and delivery. For example, content delivery system 140 can format content, combine media content, and deliver content to a user device. Content delivery system 140 transforms a particular type of media content into a different type of media content. For example, content delivery system 140 can add visual data to audio data to create mixed media, such as a video with audio data. Content delivery system 140 creates a new media item from the original content and additional content from other sources to allow media content to be distributed over a platform that only distributes content that includes a different type of media.

Content delivery system 140 can, for example, detect temporal annotations placed within particular temporal locations within content received. In some implementations, a temporal annotation is indicated by a marker or other flag that indicates to content delivery system 140 that additional content should be provided. These temporal annotations can indicate particular temporal locations or temporal periods over which additional content can be added to the original content. The temporal annotations indicate presentation characteristics including whether additional content should continue to be displayed until the next temporal annotation, the visual location at which the additional content should be displayed, the type of additional content that can be displayed, etc. The temporal annotations can be generated by the content creator and/or content provider, and can be added, edited, or deleted by the DCDS 110. In some implementations, content delivery system 140 can determine locations at which these markers should be placed within the media content. For example, content delivery system 140 can detect natural pauses in conversation within an audio content file and place markers for additional audio content (e.g., a digital component) to be provided.

In some implementations, the temporal annotations can indicate digital content slots in which digital content is expected to be delivered within media content being delivered to a user device, such as user device 106.

In some implementations, content delivery system 140 can provide the additional audio content within the stream of media content within the defined slots. For example, in some implementations, content delivery system 140 can insert a pause that serves as a defined slot within the audio file at the marker in which additional audio content can be integrated.

In some implementations, content delivery system 140 can pause the delivery of the stream of media content when a marker is detected, separately deliver additional audio content, and then resume delivery of the media content.

Figure 2:
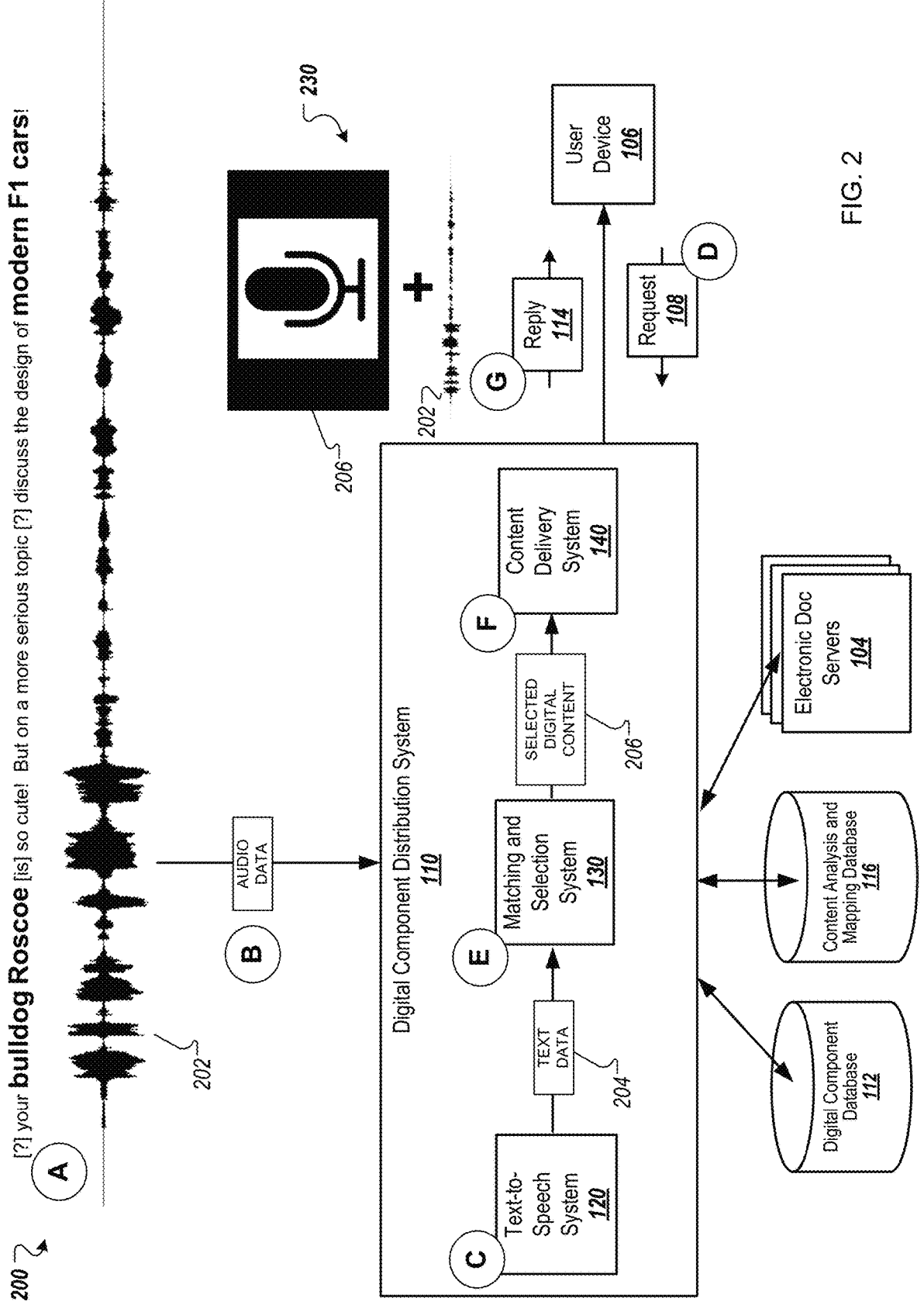
FIG. 2 depicts a data flow of an example content transformation method for improved content matching and selection.

FIG. 2 depicts a data flow 200 of an example content transformation method for improved content matching and selection in the example environment of FIG. 1. Operations of data flow 200 are performed by various components of the system 100. For example, operations of data flow 200 can be performed by DCDS 110 in communication with user device 106.

The method includes the automatic transformation of non-textual content into text so that the content can be analyzed and the matching of relevant content from other sources can using the analyzed text. For example, an original podcast file that includes only audio is first transformed into text so that the content of the audio can be analyzed and matched with additional content. Then, the original podcast file is combined with the additional content and provided to a requesting user. The additional content can be requested, for example, at the time that the additional content is to be provided with the original content, by referencing the additional content from a datastore and combined with the original content as part of a stream of data provided to the requesting user. The additional content can also be combined with the original content prior to transmission to the requesting user.

The flow begins with step A, in which non-textual media content, referred to as the "original content," is generated and uploaded to a content provider location. For example, a content creator, a podcast host Podrick Castlerock, can generate and upload audio-only media content 202 and upload the content 202 to a video hosting platform, ExamplevVideoPlatform where he periodically uploads episodes of his general interest podcast in which he discusses cool new safety features of cars and also talks about cute dogs. In some implementations, the entirety of the media content is uploaded at once. In some implementations, the media content is uploaded in real time (e.g., at the time the content is to be distributed and/or presented).

In this particular example, the non-textual media content 202 is a podcast episode called "Guest Leuy Hamster talks about new advances in F1 safety and his dog" that only includes audio data. In other examples, the non-textual media content can include a video file with audio and image data or a video file with only image data, among other types of non-textual media content. For example, the non-textual media can be a TV show or a video game. In some examples, the non-textual media content can be a simple video with audio content and static images, and such videos can simply be in a video file format but include audio content with placeholder image or video content. This placeholder image/video content can be replaced.

When the content creator uploads the content 202, the content creator can include annotations within the content 202 to mark temporal and/or visual locations where additional content can be included. For example, when Podrick Castlerock creates the podcast episode 202, he can include temporal annotations where other content, such as complementary image/video content, can be integrated with the podcast episode 202 as well as temporal annotations where digital content can be integrated with the podcast episode 202. In some implementations, if the content creator uploads a video file that includes audio content and placeholder image/video content, the content creator can include temporal annotations to mark the content as a file with audio content and replaceable video/image content. The temporal annotations can also indicate, for example, the beginning and/or end of a particular segment of the original content. In some implementations, the temporal annotations can indicate the beginning and/or end of a period in which additional content can be displayed or integrated into original content 202. For example, temporal annotations can be used to calculate a period of time during which additional content can be displayed or integrated by determining the temporal distance between the annotations. In one example, Podrick Castlerock can include temporal annotations to podcast episode 202 to indicate where a break occurs, when the topic changes, what the topic is, etc.

The flow continues with step B, in which the audio content is provided to a digital content distribution system. In this example, audio content 202 can be provided by Podrick Castlerock to DCDS 110. In some implementations, audio content 202 can be uploaded to DCDS 110 or retrieved by DCDS 110, among other ways of being obtained by DCDS 110.

The described system is particularly efficient, because the audio content can be provided to DCDS 110, which has access to a uniquely large amount of information and models with refined technology for performing portions of the described technique. As depicted in FIG. 2, DCDS 110 has access to a digital component database 112 and electronic doc servers 104. DCDS 110 can match and select digital content, such as relevant image/video content to be integrated with the original content. In some implementations, DCDS 110 can match and select digital components to be integrated with the original content in addition to the digital content to be overlaid with the original content.

The flow continues with step C, in which a text-to-speech system processes audio content received by DCDS 110 and outputs text data. For example, text-to-speech system 120 can process audio data received by DCDS 110 to generate output text data 204. The original form of the media content and the text of the media content can be stored or cached for future requests of the media content. For example, the original form and the text of the media content can be stored in a database such as content analysis and mapping database 116 or a different remote database. The database in which the original form and/or the text of the media content is stored can be indexed and/or easily searchable. The media content includes both non-textual media content from a content creator and media content to be provided as additional audio content integrated with non-textual media content.

Additionally, text-to-speech system 120 can analyze the audio content to perform functions such as enhancing the original content by adding captions, performing audio analysis for a beat pattern, generating an audio signature, performing music recognition and analysis, and performing language detection, accent detection, topic and entity detection, among other functions. In some implementations, when original content 202 is a video file, text-to-speech system can analyze the audio content and compare the complexity of the audio content to the accompanying visual content to determine whether the visual content is placeholder content or actually relevant to the audio.

In some implementations, the media content is uploaded in real-time, and steps A, B, and C are performed in real-time. For example, the upload can occur as the media content is being recorded. In some implementations, the non-textual media content is completely uploaded, and steps A, B, and C can be performed as soon as the content is received. In some implementations, the media content is completely uploaded, and steps A, B, and C can be performed when the media content is requested to be provided to a user device.

Text-to-speech system 120 performs a content transformation by analyzing characteristics of the content itself and of the stream. Whereas other text-to-speech or speech-to-text systems may be required to transcribe every word, text-to-speech system 120 does not need to transcribe every word in order to determine the intent, category, topic, volume, etc., of media content. Therefore, the system described herein is particularly efficient because it only needs to transcribe a portion of the media content. In addition, the system is able to exclude low-confidence transcriptions and rely only on high-confidence transcriptions for performing content matching and selection. In some implementations, text-to-speech system 120 can automatically exclude any transcriptions that are below a threshold level of confidence. In some implementations, text-to-speech system 120 can provide the entire transcription to matching and selection system 130, even if there is not enough to perform content matching and selection. In some implementations, text-to-speech system 120 can instead provide a message to matching and selection system 130 that not enough of the content could be transformed.

In some implementations, the additional audio content is received as text-based content and can be transformed by text-to-speech system 130 into the same type of media content as the media content being presented to user device 106. For example, the additional audio content can be received as several lines of text and can be transformed into audio-only content to match the format of Podrick Castlerock's podcast episode "Guest Leuy Hamster talks about new advances in F1 safety and his dog."

In some implementations, the additional audio content is received as non-textual content and can be transcribed by text-to-speech system 130 into text. The text of the additional audio content can then be stored within a database, such as digital component database 112. The original form of the additional audio content can be stored as well, such that matching can be performed with the text of the additional audio content, and the additional audio content itself can be provided upon request.

In some implementations, audio content can include multiple speakers. For example, podcast 202 can include two speakers: Podrick Castlerock and his guest, Leuy Hamster. Text-to-speech system 120 can differentiate between the voices of Podrick Castlerock, the host, and Leuy Hamster, the guest. In some implementations, text-to-speech system 120 can indicate within its text output 204 what text was spoken by which speaker. For example, text-to-speech system 120 can flag each portion of text with its speaker. Text-to-speech system 120 can differentiate between the voices of different speakers based on one or more characteristics of the audio. For example, text-to-speech system 120 can compare differences (e.g., frequency differences) between two voices, match the characteristics of a particular voice to a particular voice profile that indicates a unique combination of frequency and/or tone characteristics, and/or learn and develop a voice profile for each speaker, among other techniques.

The audio analysis of the audio characteristics, the topics, the entities, etc. are stored within a datastore of DCDS 110. For example, the datastore can be a relational SQL database, a document orientated database, a key-value store, or a file system, among other systems. DCDS 110 can manage the database by performing analysis on the stored data to combine attributes of the data and enrich the data available. For example, DCDS 110 can perform analysis on the stored data using an algorithm to correlate dates, times, and places to identify relevant events and entities, such as people, from that data. These identified events and entities can then be stored in the datastore and mapped to the combination of data that was analyzed. For example, if the text data 204 of the podcast episode 202 indicated that Podrick Castlerock said "Mogyoród on Aug. 23, 2003," text-to-speech system 120 can detect that the date and location are correlated with "Formula One (F1)," "2003 Hungarian Grand Prix," and "Fernando Alonso," who won that Grand Prix, and that it was Fernando Alonso's first race win in F1. DCDS 110 can perform this analysis using data from the datastore and data available through sources such as search engine archives.

The flow continues with step D, in which DCDS 110 receives, from a user device, a request for content that includes various information, such as information about the user of the user device. For example, DCDS 110 can receive a request 108 from a user of user device 106 that includes profile information of the user. The request can include more than one request or can be parsed by DCDS 110 into sub-requests. For example, the request can include a request for other content to be overlaid over the audio of the podcast episode 202 and a request for a digital component to be inserted into the combined content resulting from the combination of the podcast episode 202 and any other content that is overlaid with the podcast episode 202. In some implementations, the request is generated by the user device 106 when the podcast episode 202 is requested. For example, when the podcast episode 202 is streamed to the user device 106, the user device 106 can generate one or more requests for additional content. The request can include one or more temporal annotations for the context in which additional content is requested, the length of time for which additional content is requested, the display size of the additional content requested, the file size of the additional content requested, etc.

In some implementations, DCDS 110 receives every request that will be generated for the podcast episode 202 throughout the entire length of the episode. For example, if there are four slots for digital components throughout the episode 202 and there are two potential slots for other content to be overlaid with the episode 202, then DCDS 110 can receive all six requests at the time that the user device 106 requests the podcast episode 202. In some implementations, DCDS 110 receives the requests in real-time as the podcast episode 202 is streamed to the user device 106.

The flow continues with step E, in which matching and selection system 130 uses the text data 204 from text-to-speech system 120 to perform matching and selection of digital content to be presented with media content. The text data 204 can include text data of the media content being streamed to user device 106 as well as the text data of digital content available for presentation with the media content. In some implementations, matching and selection system 130 can access text data 204 from a database that is searchable.

Based on the analysis data stored in content analysis and mapping database 116 of DCDS 110 by text-to-speech system 120 and other systems that have access to the database 116, the DCDS 110 finds additional content to be provided with the original content. For example, matching and selection system 130 can match the original content 202 to other content to be overlaid on the original content 202 and separately match the original content 202 to a digital component to be presented with the original content 202.

The matching and selection system 130 accesses databases including digital component database 112, content analysis and mapping database 116, and electronic doc server 104 to perform its matching and selection process. In some implementations, this is retrieval system can be an extensible system that includes modules that can query and access different sources, including search engines and databases external to system 100. For example, the matching and selection system 130 can query and access a stock photo source and incorporate stock photos into the original content 202 while attributing the photos to the source.

The matching and selection system 130 can scrape/search the Internet and other sources for relevant image, video, audio, text data, etc. from multiple sources and categorize and store the data within content analysis and mapping database. In some implementations, matching and selection system 130 stores the content and its relationships to the relevant characteristics. In some implementations, matching and selection system 130 stores the relationships between the content and relevant characteristics and a pointer to the location of the content within an external source.

The matching and selection system 130 uses the stored relationships and content to choose the most relevant other content and/or digital component to include with the original content in response to a particular request. For example, the matching and selection system 130 uses the stored relationships and analysis within content analysis and mapping database 116 to match specified criteria in the request to characteristics and parameters of content in electronic doc servers 104 and digital components in digital component database 112.

For each request, the matching and selection system 130 can first retrieve a number of candidate content items that match the criteria specified within the request. For example, the matching and selection system 130 can retrieve one or more candidates from digital component database 112, electronic doc server 104, content analysis and mapping database 116 or one or more other sources. These candidate content items can be retrieved based on matching a threshold number of criteria specified within the request. In some implementations, the candidate content items must match each criterion. In some implementations, if no candidate content item matches all criteria specified within a request, matching and selection system 130 will retrieve content items matching a threshold number of criteria. In other implementations, matching and selection system 130 does not retrieve any candidates, and will not return a reply in step G.

The matching and selection system 130 can retrieve candidates based on characteristics such as subject matter or topic, display size, file size, image quality or audio quality, entities mentioned within the content item, entities existing within a content item (i.e., a particular historical figure is pictured in a candidate image), etc. The candidates can then be ranked according to characteristics and/or parameters specified by the request or the matching and selection system 130. For example, the candidates can be ranked based on technical features such as quality, bandwidth available over a connection to the content source, hardware specifications of the user device 106 at which the content will be displayed, location of the content, display or file size of the content, light distribution within visual content, sound quality and magnitude of sound within audio content, etc. Matching and selection system 130 can retrieve, for each candidate content item, the source of the content item, the content item itself, parameters and characteristics of the content item, etc. In some implementations, matching and selection system 130 can determine particular properties of the content item.

In some implementations, step E can occur prior to step D, or in parallel with step D, based on whether other content or digital components are being selected. For example, temporal annotations created by a content creator within the original content 202 can indicate that particular slots or requests for additional content can be performed prior to receiving a request from the user device 106. In some implementations, text-to-speech system 120 can identify temporal locations within the audio data 302 and/or display locations at which additional content can be integrated with the audio data 302.

Matching and selection system 130 performs the matching and selection process according to techniques used with text content. For example, matching and selection system 130 can match characteristics, such as topic or entity, to digital content items. Particular characteristics of the media content can be given more weight than other characteristics when determining other characteristics. For example, matching and selection system 130 can give the title of a podcast episode more weight than words that are simply within the content of the episode. In some implementations, matching and selection system 130 determines and assigns a topic, or some other information, to the additional audio content.

Matching and selection system 130 can assign more weight to words spoken at the beginning of different speaker's time speaking, to words spoken with particular tones of voice, to phrases containing a particular entity or topic. In some implementations, matching and selection system 130 assigns particular weight to words spoken by the host of the content if there are multiple speakers. For example, on a podcast or talk show, the host may ask guests to join them, but the guests may have views that the host does not agree with. Matching and selection system 130 can default to matching content only to what is spoken by the host. In some implementations, matching and selection system 130 can provide content creators and/or publishers with the option of choosing whether they would like to allow for content matching and what portions of their content can be used for content matching. Matching and selection system 130 can also provide users (content creators, publishers, end users) with the option of disallowing certain types/categories of digital content to be provided with the media content being streamed.

Additionally, matching and selection system 130 can assign more weight to matching characteristics. For example, subject-matter related parameters can be given more weight than formatting or technical features. In one example, if a video file matches the parameters specified within the request but is larger than the display size specified within the request, the video file can still be selected as a candidate. In some implementations, matching and selection system 130 assigns weight to matching characteristics based on other characteristics, including the quality of the additional audio content to be selected, the quality of the media content being streamed to the user device, whether there is music in the background, and/or the type of music being played, among other characteristics.

Text-to-speech system 120 can capture characteristics of the non-textual content and provide these characteristics to matching and selection system 130. For example, text-to-speech system 120 can determine that the creator of the content has placed emphasis or other special significance on particular words or phrases and draw parallels between non-textual emphasis and a textual counterpart. In one example, text-to-speech system 120 can determine that if the person speaking in the audio content says a particular word or phrase loudly, the word or phrase may be considered to be emphasized in the same way as bold text, underlined text, larger font, among other visual forms of emphasis. Other forms of audible emphasis include the pitch and speed of the word(s) or phrase(s) being spoken. For example, if a speaker uses a very low pitch and speaks a phrase quickly, text-to-speech system 120 may determine that the phrase was not meant to be important, or that the speaker did not agree with the phrase being said.

For example, podcast 202 is shown to include audio data that indicates an audible indication, in this case corresponding to a larger magnitude, for the words "bulldog Roscoe" and "modern F1 cars" than other words, and text-to-speech system 120 can consider the words to emphasized as if they had been bolded, and matching and selection system 130 can assign weight to the words as if they were bolded, or otherwise add metadata indicating the increased emphasis, such as bolding or underlining. Matching and selection system 130 can use audible indications of the words spoken in the audio content in addition to indications provided within sources such as metadata.

Matching and selection system 130 can continually improve its matching and selection algorithms and process. For example, matching and selection system 130 can determine that certain members of Podrick Castlerock's audience will stream each of his podcast episodes, but do not necessarily listen to the entirety of the podcast. Matching and selection system 130 can then assign a probability of match to content that increases over time for particular content where a user is likely to eventually hear it. As described above with respect to FIG. 1, matching and selection system 130 can use machine learning models and probabilistic models.

In some implementations, when matching and selection system 130 either determines or receives a message that there is not enough of the transformed content to perform matching and selection, matching and selection system 130 can select a default or generic type of digital content to provide to the user device with the media content.

In some implementations, matching and selection system 130 can access profile information for the user of user device 106 and/or for the content creator or publisher to augment and/or improve the matching and selection process. For example, matching and selection system 130 can access a user's profile information to determine that the user is not interested in seeing content about cat food, but is interested in content about dog food, because the user has indicated that they own a dog, even though the user is interested in content related to animals in general.

In some implementations, matching and selection system 130 can give more weight to information matching the user's profile. For example, matching and selection system 130 can personalize additional audio content based on the user's profile, the content within the media content being streamed, and to the media content's creator and/or publisher.

In some implementations, step E also includes running the selected digital content, which was in text format, through text-to-speech system 120 to produce audio content to be presented with the media content 202.

Matching and selection system 130 can select a specific portion of selected content that is most relevant to the criteria specified within the request. For example, matching and selection system 130 can crop an image or create a clip of a video having the most relevant content to the criteria specified within the request. Once the content has been selected as the winning content of the selection process performed by matching and selection system 130, matching and selection system 130 can edit the selected content according to parameters and criteria specified within the request. For example, if the request specifies a display size of 1920×1080 pixels, and a selected video has a display size of 1280×720 pixels, matching and selection system 130 can scale the selected video to a display size of 1920×1080 pixels. Matching and selection system 130 can also crop an image or video to a smaller display size without altering the quality of the content. In some implementations, matching and selection system 130 can downscale an image or video to a smaller resolution, effectively increasing the quality of the content.

Matching and selection system 130 can edit the content according to quality criteria specified within the request. For example, matching and selection system 130 can determine whether to crop, downscale, or upscale content based on a resolution quality specified by the request.

In some implementations, this editing can occur in step F and be performed by content delivery system 140.

The flow continues with step F, in which content delivery system 140 identifies a designated time or slot during which the selected digital content is to be presented and provides the selected digital content to user device 106.

As described previously, DCDS 110 can detect and/or determine slots in which additional audio content should be placed. Content delivery system 140 can detect, based on the temporal annotations within the original content 202, the appropriate temporal and display locations at which selected digital content 206 should be placed within the original content 202. In some implementations, the temporal annotations indicate that the selected content 206 should be overlaid with the original content 202. In some implementations, the temporal annotations indicate that the selected content 206 should be inserted into the original content 202 such that the original content 202 is paused when the selected content 206 begins and the original content 202 continues when the selected content 206 ends.

Content delivery system 140 can create a new file 230 by placing the selected content 206 at the temporal and display locations indicated by the temporal annotations in the original content 202. For example, content delivery system 140 can overlay a selected image of a generic microphone (to represent a podcast) 206 over the podcast episode audio file 202 to create new file 230, which is a video file. Once the video file 230 is created, the video file 230 can be streamed to or viewed by a user of user device 106.

Content delivery system 140 can edit the selected content 206 as described above with respect to step E. For example, content delivery system 140 can visually edit the selected content 206 to create a cropped section of the most relevant portion of a selected image 206. Content delivery system 140 can also temporally edit the selected content 206 to clip a selected video 206 to fit the required temporal requirements indicated by the temporal annotations included with the content 202. In some implementations, content delivery system 140 can edit the selected content to separate audio and visual data within a video file. For example, content delivery system 140 can strip the audio data from a selected video 206 having audio data and visual data, to create a silent video and overlay the silent video with the audio data of podcast episode 202.

Content delivery system 140 can determine where, within a display area, to display selected visual content 202 and place the visual content in the appropriate position within the display area to create new file 230. For example, if selected content 206 is smaller than the full display area specified for original content 202, and temporal annotations included with original content 202 specify a particular placement for the selected content 206, content delivery system 140 can place the selected content 206 in the specified location within the display area, at the specified temporal location, for the specified temporal period, to create the new file 230.

In some implementations, content delivery system 140 of DCDS 110 can automatically determine and indicate exclusion zones. Exclusion zones, or portions of the content in which additional content should not be inserted or in which content presented during the zones should be omitted from analysis, can be defined by a user such as a content creator or publisher. Exclusion zones can be temporal periods or display areas within which selected content 206 should not be integrated. For example, content delivery system 140 can determine when a natural pause occurs and insert a content slot while creating exclusion zones such that content is not interrupted in the middle of a sentence or segment.

In some implementations, the content creator can specify exclusion zones in which additional content should not be integrated. The content creator can specify different exclusion zones for each original content 202, and can use, for example, temporal annotations that also specify visual locations within a display area. For example, a content creator can include temporal annotations that indicate that a particular portion of a video provided as original content 202 includes a special message and should not be overlaid or visually obscured for a period of time. In some implementations, the content creator can use other markers, including an inaudible tone within audio-only content. For example, the content creator can use a first inaudible tone to indicate the beginning of an exclusion zone and a second inaudible tone to indicate the end of the exclusion zone. In some implementations, the first inaudible tone and the second inaudible tone are the same tone. In some implementations, the first inaudible tone and the second inaudible tone have different properties, such as amplitude, frequency, etc.

In some implementations, if the original content 202 includes visual data, the DCDS 110 can replace the visual data or overlay the selected content 206 over portions (or all) of the existing visual data. For example, DCDS 110 can automatically detect and improve the quality of original content 202. In one example, the DCDS 110 can determine a quality of the visual or audio data of original content 202, and if the same visual or audio data is available from another source, the DCDS 110 can replace the visual or audio data of original content 202 to generate a new file 230. For example, if a content creator uses the same static image as a watermark, or a clip as an introductory soundbite in their podcast, and the DCDS 110 detects that the watermark or soundbite has degraded in quality from the watermark or soundbite used in a previous upload from the content creator, the DCDS 110 can automatically replace the watermark or soundbite. In some implementations, the DCDS 110 can simply overlay the better quality image.

In some implementations, media content being streamed can include additional content, such as sponsored content. Content delivery system 140 can create an exclusion zone for the duration of the sponsored content so as not to confuse listeners or viewers. For example, Podrick Castlerock may say a few sentences during "Guest Leuy Hamster talks about new advances in F1 safety and his dog" about GenericCoolCar Brand M because the episode is sponsored by GenericCoolCar Brand M. Content delivery system 140 can detect these few sentences and create an exclusion zone such that no additional audio content is inserted into Podrick Castlerock's sponsored spiel about GenericCoolCar Brand M.

Content delivery system 140 may also be able to detect additional content within media content being streamed based on the topic of the content. For example, Podrick Castlerock may promote the Example Brand Phone as a cool phone with an awesome camera app within his car enthusiast podcasts. Content delivery system 140 can determine that Podrick Castlerock's podcasts are about cars, and that his promotion of the Example Brand Phone identifies a particular brand and is about smartphones and therefore regarding a topic wholly unrelated to cars. Content delivery system 140 can then determine that his promotion of the Example Brand Phone should be within an exclusion zone. Alternatively, or additionally, exclusion zones can be set during a discussion of a particular content so that the original content related to the discussion of that topic is not disrupted or segmented.

Content delivery system 140 can designate exclusion zones based on entities mentioned within the media content. For example, content delivery system 140 can detect a product name within the media content and omit, from the textual content of the media content, any words spoken within a specified amount of time of the location of the product name in the second audio. In one example, content delivery system 140 can detect that Podrick Castlerock mentions BRAND Y butter is great butter, which all cool car drivers eat with their toast, and can determine that any words spoken within 10 seconds of when "BRAND Y" was spoken. The amount of time before and after a particular word is spoken does not have to be the same, and in some implementations, content delivery system 140 can detect whether the entity name is spoken at the beginning, middle, or end of a promotion segment to adjust the bounds of the exclusion zone.

Content delivery system 140 also performs the delivery of the selected digital content 206 to user device 106 in response to the request 108. Content delivery system 140 can provide the selected digital content 206 in reply 114.

In some implementations, DCDS 110 can act as an intermediary for delivering the media content being streamed to user device 106. For example, DCDS 110 can receive the media content, insert the additional, selected digital content into the media content, and stream the media content, along with the selected digital content, to user device 106 so that user device 106 receives a continuous stream of content.

In some implementations, system 100 as described with respect to FIGS. 1-2 can pause the stream of media content, stream the selected digital content from a different source during the designated content slot, and then continue the stream of media content to user device 106.

Content delivery system 140 can edit the original content 202, the selected content 206, and/or the new file 230 prior to delivery of reply 114 to the user device 106. For example, if the user device 106 is unable to handle the quality or size of the reply 114, content delivery system 140 can adjust the transcoding of new file 230 prior to delivery to the user device 106.

The flow concludes with step G, in which DCDS 110 provides, to the user device, a reply. For example, DCDS 110 provides the new file 230 within a reply 114 as described above with respect to FIG. 1 to user device 106.

Figure 3:
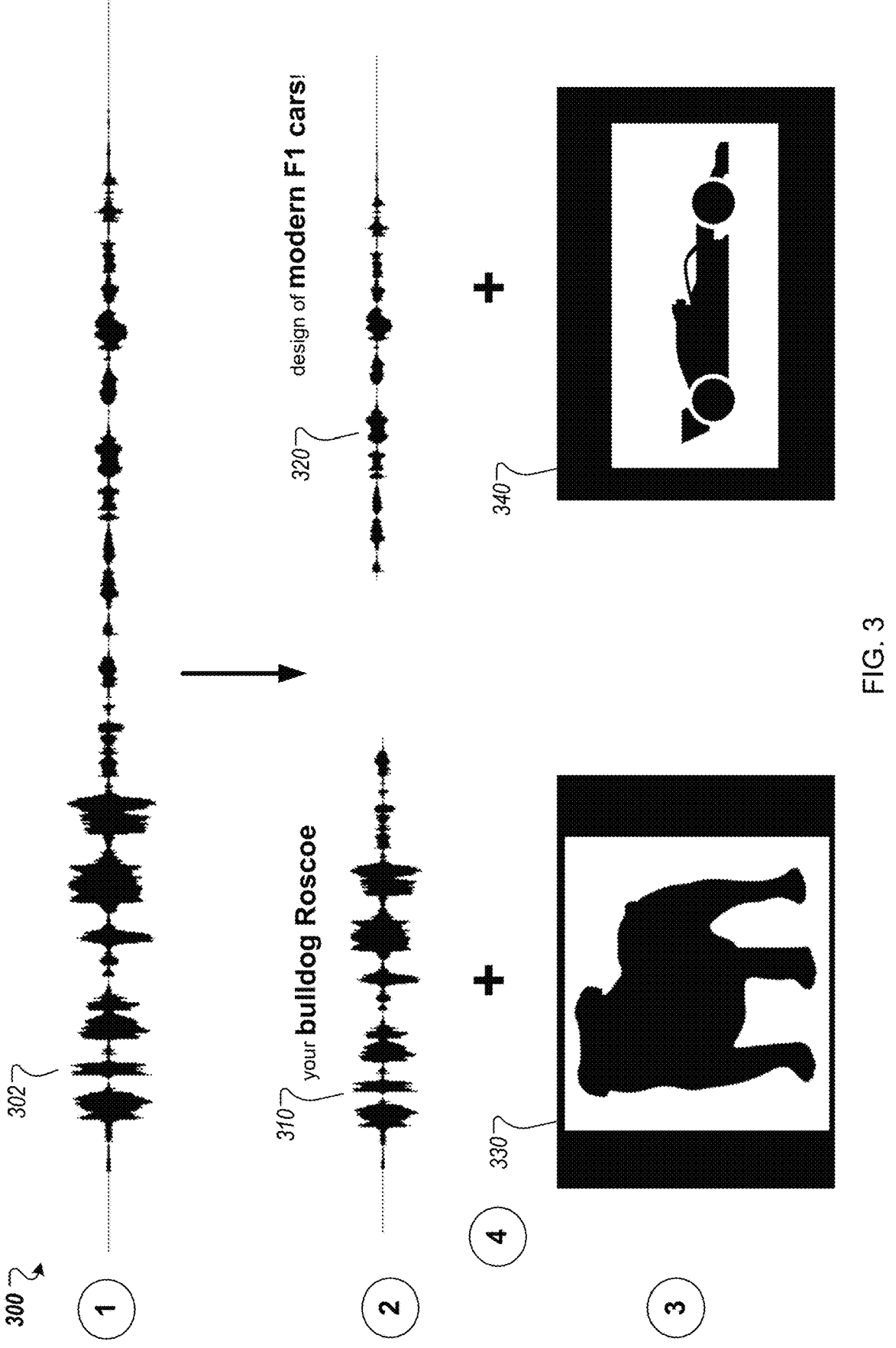
FIG. 3 depicts an example content transformation method for improved content matching and selection.

FIG. 3 depicts an example content transformation process 300 for improved content matching and selection in the example environment of FIGS. 1-2. Operations of process 300 are performed by various components of the system 100 and as described with respect to process 200. For example, operations of process 300 can be performed by DCDS 110 in communication with user devices 106.

In stage 1, DCDS 110 receives original content 302. In this particular example, original content 302 is an audio-only file of a podcast recorded by host Podrick Castlerock. Original content 302 can be similar to original content 202 as described with respect to FIG. 2.

In stage 2, DCDS 110 parses audio data 302 into segments 310 and 320. For example, text-to-speech system 120 can perform the parsing of audio data 302. Text-to-speech system 120 can automatically detect natural pauses, changes in topic, changes in speaker, etc. to determine where a segment begins and ends. In some implementations, the original content 302 includes temporal annotations, or markers, that indicate segments designated by the content creator.

In this example, DCDS 110 parses the audio data 302 into segments 310 and 320 based on detecting a subject matter of each segment. Text-to-speech system 120 performs an analysis on the subject matter of the audio data 302 as well as the technical properties of the audio data 302 as described above with respect to FIG. 2. For example, text-to-speech system 120 can detect the temporal boundaries indicated by the temporal annotations, entities or topics mentioned in the audio data 302, etc. and identify temporal locations within the audio data 302 and/or display locations at which additional content can be integrated with the audio data 302.

In some implementations, DCDS 110 can group segments of original content 302 using timestamps of the content. For example, DCDS 110 can determine that particular segments are relevant to each other even if their topics seem disparate due to the temporal proximity of the segments to each other. In some implementations, DCDS 110 can use the groups of segments to reduce processing resources required to select additional content for a particular segment. For example, DCDS 110 can select a particular image to be displayed along with a particular segment of audio content, and can use the same image, or a related image, for a related segment of the original content. In other implementations, DCDS 110 can group the content of various other portions of the original content based on analysis performed by matching and selection system 130 as described above with respect to FIG. 2.

For example, text-to-speech system 120 detects in audio data 302 that a bulldog Roscoe is mentioned. Text-to-speech system 120 can then determine, for a particular length of audio data 302, that the topic is the bulldog Roscoe, and can create segment 310. Additionally, text-to-speech system 120 detects in audio data 302 that modern F1 cars are also mentioned. Text-to-speech system 120 can then determine, for a particular length of audio data 302, that the topic is modern F1 cars.

In some implementations, stage 2 is performed when the content creator or content provider uploads the content to a system, such as DCDS 110. For example, DCDS 110 can perform the process to generate and detect annotations and perform content analysis when the content is uploaded. In some implementations, stage 2 is performed as the content is requested by a user device 106. For example, DCDS 110 can perform the processing to generate and detect annotations and perform content analysis in real-time as the original content 302 is being streamed to the user device 106.

In some implementations, stage 2 is performed as a batch process on several original content items that are uploaded within a particular period of time.

In stage 3, DCDS 110 matches characteristics and parameters of the parsed segments to candidate content, such as an image or video data. For example, once audio data 302 has been parsed into segments 310 and 320, matching and selection system 130 can match characteristics and parameters of the segments 310 and 320 to candidate digital components in digital component database 112, to candidate other content in electronic doc servers 104, or to candidate digital components or other content in content analysis and mapping database 116 or other sources.

In some implementations, stage 3 is performed in response to a trigger event, such as a request from a user device to access the original content. For example, stage 3 can be performed in response to a request to access original content 302 from a user device 106. In this particular example, matching and selection system 130 performs a selection process on the candidate content and selects an image 330 of a bulldog to be displayed with the segment 310. Matching and selection system 130 also performs a selection process on the candidate content and selects a video 340 of a modern F1 car.

In some implementations, the selection process can yield different results based on the time at which the selection process is triggered. For example, candidate content items for "modern F1 car" in 2012 would differ greatly from candidate content items for "modern F1 car" in 2020.

Thus the system as described in FIGS. 1-3 allow for the dynamic, personalization of content not only to a user's interests, but also to the current times, such that the relevance of additional content selected and displayed along with original content can consistently be refreshed and tailored for each user, each time the content is requested.

In stage 4, DCDS 110 combines the original content and the selected, additional content to generate new content to provide to a requesting device. For example, as described above with respect to FIGS. 1-2, content delivery system 140 can combine the segments 310 and 320 with the additional content 330 and 340, respectively, for delivery to the user device 106. In some implementations, content delivery system 140 creates a new, combined file. In some implementations, content delivery system 140 can provide two separate streams of data to the user device 106.

FIG. 4 is a flow diagram of an example process 400 of content transformation including matching and selection. In some implementations, process 400 can be performed by one or more systems. For example, process 400 can be implemented by DCDS 110 and/or user device(s) 106 of FIGS. 1-3. In some implementations, the process 400 can be implemented as instructions stored on a computer readable medium which may be non-transitory, and when the instructions are executed by one or more servers, the instructions can cause the one or more servers to perform operations of the process 400.

Process 400 begins with receiving media content comprising audio data for distribution through a content distribution platform that requires the media content to include video content (402). For example, system 100 can obtain a podcast episode 202 from Podrick Castlerock. In this example, the podcast episode 202 is an audio-only file. The media content can be pre-recorded, or complete at the time of receipt, or live, such that more of the content is being obtained continuously. In some implementations, the media content can be provided to user device 106 directly from the content creator and/or publish. In other implementations, the media content can be provided to DCDS 112 which acts as an intermediary and provides the media content to user device 106. The podcast episode 202 is received for distribution through a platform that requires the media content to include video content, such as a video hosting platform. For example, Podrick Castlerock may want to reach listeners on a video hosting platform Example Video Hosting Platform Site, which has a larger overall audience than an audio-only podcast hosting platform where Podrick usually hosts his audio-only files.

Process 400 continues with transforming the audio data into textual content (404). For example, text-to-speech system 120 can transform the podcast 202 to be streamed to user device 106 into text content 204. In some implementations, transforming the second audio includes detecting spoken words in the second audio, analyzing one or more audio characteristics of the second audio, adjusting an importance of one or more words from among the spoken words based on the analysis of the one or more audio characteristics, generating the textual content representing the spoken words, and assigning the adjusted importance of the one or more words to the textual content representing the one or more words. For example, text-to-speech system 120 can detect spoken words in the podcast 202, analyzing one or more audio characteristics of the podcast 202 such as vocal emphasis, generating a textual representation of the spoken words, such as text data 204, and assigning and/or adjusting weights of one or more words within text data 204.

In some implementations, analyzing the one or more audio characteristics of the second audio comprises detecting an audible indication of emphasis for the one or more words. For example, an audible indication of emphasis can include repetition of the one or more words, or a volume or tone of voice of the speaker of the words. In some implementations, analyzing one or more audio characteristics comprises differentiating between a first portion of the spoken words that are spoken by a host voice in the second audio and a second portion of the spoken words that are spoken by a guest voice in the second audio. For example, text-to-speech system 120 can designate portions of spoken words that are spoken by the host Podrick Castlerock and portions of spoken words that are spoken by the guest Leuy Hamster.

In some implementations, adjusting the importance of the one or more words comprises increasing the importance of the one or more words based on the audible indication of emphasis. For example, text-to-speech system 120 can increase the weight of the words based on the audible indication of emphasis within a model for matching and selecting digital content. In some implementations, adjusting the importance of the one or more words comprises increasing the importance of the first potion of spoken words relative to the importance of the second portion of the spoken words. For example, text-to-speech system 120 can increase the weight of the words spoken by the host Podrick Castlerock relative to the weight of the words spoken by the guest Leuy Hamster.

In some implementations, determining the context of the second audio comprises determining a topic of the first audio based on the adjusted importance of the one or more words that is assigned to the textual content representing the one or more words. For example, matching and selection system 130 can determine a topic of the audio clip promoting dog toys based on the weight of words associated with the topic of the audio clip.

In some implementations, the importance, or weight, of particular words can be changed based on emphasis, location within a detected paragraph of the media content, term frequency, among other characteristics. In some implementations, the weight of words can be increase because of a match between a word in the text description of the media content and the detected audio. In some implementations, the weight of words can be adjusted based on whether it is the host or the guest who spoke the words.

Process 400 continues with determining, based on a search of a searchable database, that the textual content of the audio data matches characteristics of visual data in the searchable database (406). For example, matching and selection system 130 can determine that the textual content of the podcast episode 202 matches characteristics of one or more content items having visual data in a searchable database such as content analysis and mapping database 116, electronic doc servers 104, and/or digital component database 112. Matching and selection system 130 can then select a content item having visual data, such as an image 330.

In some implementations, the media content can be delivered separately from the visual data, and the media content can be paused while the visual data is provided to user device 106 and restarted when the visual data ends.

In some implementations, the process 400 includes detecting an annotation located at a particular temporal location within the media content, and wherein integrating the visual data with the media content to create the augmented content stream comprises overlaying, based on the annotation, the visual data with the media content at the particular temporal location within the media content. For example, text-to-speech system 120 can detect a temporal annotation at a particular temporal location within the podcast 202. Integrating the visual data (in this example, the image 330) to create the augmented content stream comprises overlaying the image 330 with the podcast 202 to create a new file 230 that is a video file.

In some implementations, the annotation specifies one or more visual data characteristics. For example, the temporal annotation can specify a resolution size for the image 330 to be overlaid with the podcast 202. In some implementations, integrating the visual data with the media content to create the augmented content stream further comprises editing the visual data based on the one or more visual data characteristics. For example, the matching and selection system 130 or the content delivery system 140 can scale the image 330 according to the resolution specified by the temporal annotation.

Process 400 continues with integrating the visual data having the matched characteristics with the media content to create an augmented content stream in response to the determination that the textual content of the audio data matches the characteristics of the visual data (408). For example, content delivery system 140 can overlay the image 330 (or a video) with the podcast 202 to create an augmented content stream that includes multiple types of media. Content delivery system 140 thus creates a new media item by converting a media item of a particular type into the new media item, which includes at least one different type of data. In this particular example, content delivery system 140 creates a new media item 230 that includes video data such that the content of the audio-only podcast 202 can be distributed through a content distribution platform (Example Video Hosting Platform Site) which requires video data.

In some implementations, the process includes determining a first context of the media content based on the textual content of the audio data and determining a second context of the visual data based on the characteristics of the visual data in the searchable database, and wherein determining that the textual content of the audio data matches characteristics of the visual data in the searchable database comprises determining that the first context matches the second context. This context can be a topic, or some other information that can be determined from the text obtained from the podcast. For example, content delivery system 140 can overlay the image 330 with the podcast 202 to create an augmented content stream after determining that the topic of the podcast 202 "Guest Leuy Hamster talks about new advances in F1 safety and his dog" matches the context of the image 330, which depicts a bulldog.

In some implementations, the process 400 includes identifying a particular temporal location within the media content based on the first context of the media content, and integrating the visual data with the media content to create the augmented content stream comprises overlaying the visual data with the media content at the particular temporal location within the media content. For example, the DCDS 110 can parse the podcast 202 into segments and determine a context for each segment. The DCDS 110 can then integrate the image 330 with the podcast 202 at a temporal location determined by the DCDS 110.

In some implementations, the process includes identifying exclusion zones for the media content. For example, the temporal annotation can specify that visual data cannot be overlaid with the media content at the particular temporal location.

Process 400 continues with distributing the augmented content stream through the content distribution platform that requires the media content to include video content (410). For example, content delivery system 140 can distribute the new content 230 through the content distribution system Example Video Hosting Platform Site that requires video data. Process 400 allows content to be distributed across different platforms that require different types of data by transforming the content into new content without diminishing the quality of the original content.

In some implementations, content delivery system 140 can determine, at the time of distributing the content stream, whether to integrate visual data of a different quality with the original media content. For example, content delivery system 140 can determine, based on available network resources, such as bandwidth, and device capabilities, such as the processing capabilities of a user device to which the augmented content stream will be delivered, whether to integrate the visual data or to integrate the visual data at a higher or lower resolution. In one example, content delivery system 140 can determine that there is low bandwidth available, and can integrate the visual data at a lower resolution with the media content to create the augmented content stream.

In some implementations, content delivery system 140 can replace existing data within the original media content to improve the quality of the content or to adapt the content to the capabilities of the receiving device and/or the available network and processing resources. For example, content delivery system 140 can determine, for an original media content item, that the original media content item includes data that exists in the searchable database, such as digital component database 112, content analysis and mapping database 116, and/or electronic doc servers 104. Content delivery system 140 can replace data in the original media content item that exists in the searchable database at a different resolution and automatically replace the content in the original media content item to improve content quality. For example, content delivery system 140 can determine that image data in the original media content exists in a higher resolution in the searchable database and replace the image content with the image data at the higher resolution that is available in the searchable database.

Process 400 and the system as described with respect to FIGS. 1-4 can be applied in any streaming environment, such as TV, movies, and online gaming, among other environments.

Figure 5:
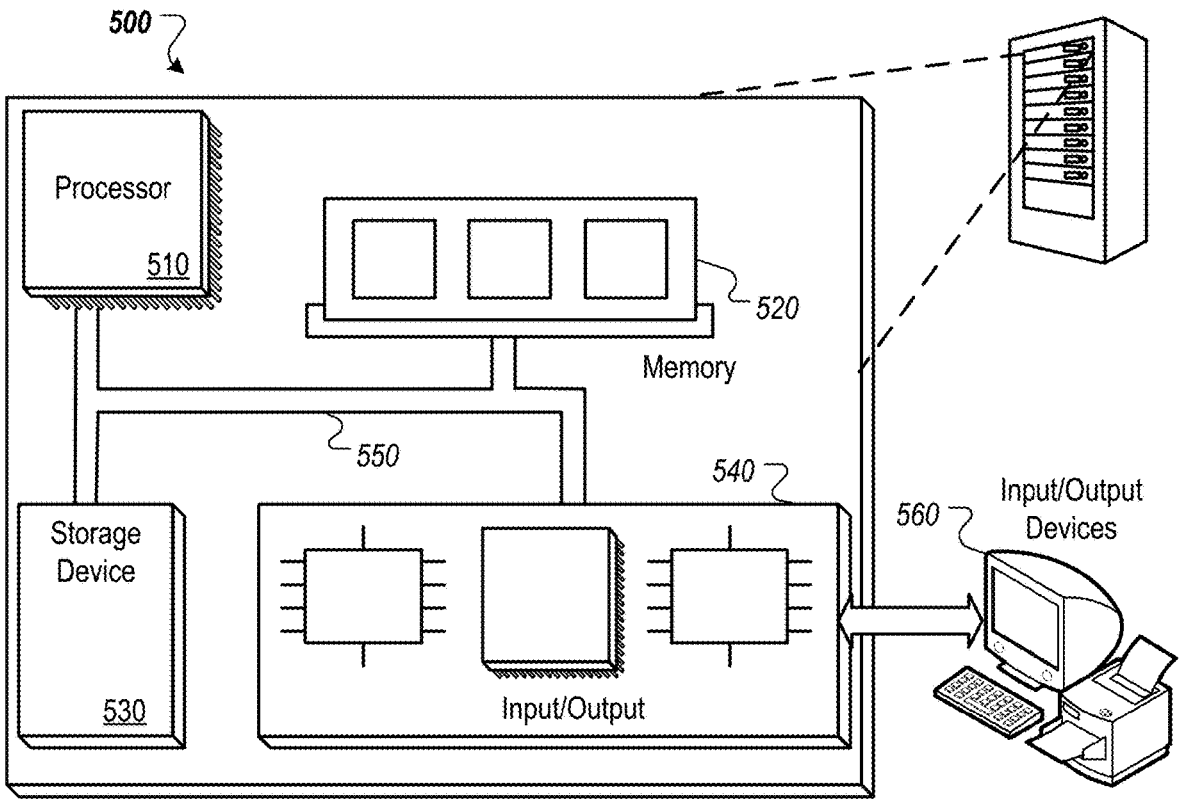
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

In situations in which techniques discussed throughout this document collect and/or use information about a user, the user (such as an end user, content generator, or content provider, among other types of users) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving audio data for distribution through content distribution platform, wherein the audio data includes first speech of a first person and second speech of a second person;
differentiating the first speech of the first person in the audio data from the second speech of the second person in the audio data;
transforming the audio data into textual content;
flagging a first set of the textual content as being the first speech of the first person in the audio data;
flagging a second set of the textual content as being the second speech of the second person in the audio data;
selecting, based on a search of a searchable database using the first set of textual content instead of the second set of textual content, visual data in the searchable database based on the first set of the textual content being flagged as being the first speech of the first person in the audio data;
integrating the visual data selected based on the first set of textual content with the audio data to create an augmented content stream that includes the visual data, audio of the first speech of the first person, and audio of the second speech of the second person; and
distributing, to a user that has requested the audio data, the augmented content stream through the content distribution platform.

2. The method of claim 1, further comprising:
detecting an annotation located at a particular temporal location within the audio data; and wherein integrating the visual data with the audio data to create the augmented content stream comprises overlaying, based on the annotation, the visual data with the audio data at the particular temporal location within the media content.

3. The method of claim 2, wherein the annotation specifies one or more visual data characteristics.

4. The method of claim 2, wherein integrating the visual data with the audio data to create the augmented content stream further comprises editing the visual data based on one or more visual data characteristics.

5. The method of claim 2, wherein the annotation specifies that visual data cannot be overlaid with the audio data at the particular temporal location.

6. The method of claim 1, further comprising:
determining a first context of the audio data based on the textual content of the audio data;
determining a second context of the visual data based on characteristics of the visual data in the searchable database; and
determining that the textual content of the audio data matches the characteristics of the visual data in the searchable database based on the first context matching the second context.

7. The method of claim 6, further comprising:
identifying a particular temporal location within the audio data based on the first context of the audio data; and
wherein integrating the visual data with the audio data to create the augmented content stream comprises overlaying the visual data with the audio data at the particular temporal location within the audio data.

8. A system comprising:
one or more processors; and
one or more memory elements including instructions that, when executed, cause the one or more processors to perform operations including:
receiving audio data for distribution through content distribution platform, wherein the audio data includes first speech of a first person and second speech of a second person;
differentiating the first speech of the first person in the audio data from the second speech of the second person in the audio data;
transforming the audio data into textual content;
flagging a first set of the textual content as being the first speech of the first person in the audio data;
flagging a second set of the textual content as being the second speech of the second person in the audio data;
selecting, based on a search of a searchable database using the first set of textual content instead of the second set of textual content, visual data in the searchable database based on the first set of the textual content being flagged as being the first speech of the first person in the audio data;
integrating the visual data selected based on the first set of textual content with the audio data to create an augmented content stream that includes the visual data, audio of the first speech of the first person, and audio of the second speech of the second person; and
distributing, to a user that has requested the audio data, the augmented content stream through the content distribution platform.

9. The system of claim 8, the operations further comprising:
detecting an annotation located at a particular temporal location within the audio data; and wherein integrating the visual data with the audio data to create the augmented content stream comprises overlaying, based on the annotation, the visual data with the audio data at the particular temporal location within the audio data.

10. The system of claim 9, wherein the annotation specifies one or more visual data characteristics.

11. The system of claim 9, wherein integrating the visual data with the audio data to create the augmented content stream further comprises editing the visual data based on one or more visual data characteristics.

12. The system of claim 9, wherein the annotation specifies that visual data cannot be overlaid with the audio data at the particular temporal location.

13. The system of claim 8, the operations further comprising:

determining a first context of the audio data based on the textual content of the audio data;

determining a second context of the visual data based on characteristics of the visual data in the searchable database; and determining that the textual content of the audio data matches the characteristics of the visual data in the searchable database based on the first context matching the second context.

14. The system of claim 13, the operations further comprising:

identifying a particular temporal location within the audio data based on the first context of the audio data; and wherein integrating the visual data with the audio data to create the augmented content stream comprises overlaying the visual data with the audio data at the particular temporal location within the audio data.

15. A non-transitory computer-storage medium encoded with instructions that when executed by a distributed computing system cause the distributed computing system to perform operations comprising:

receiving audio data for distribution through content distribution platform, wherein the audio data includes first speech of a first person and second speech of a second person;

differentiating the first speech of the first person in the audio data from the second speech of the second person in the audio data;

transforming the audio data into textual content;

flagging a first set of the textual content as being the first speech of the first person in the audio data;

flagging a second set of the textual content as being the second speech of the second person in the audio data;

selecting, based on a search of a searchable database using the first set of textual content instead of the second set of textual content, visual data in the searchable database based on the first set of the textual content being flagged as being the first speech of the first person in the audio data;

integrating the visual data selected based on the first set of textual content with the audio data to create an augmented content stream that includes the visual data, audio of the first speech of the first person, and audio of the second speech of the second person; and distributing, to a user that has requested the audio data, the augmented content stream through the content distribution platform.

16. The non-transitory computer-storage medium of claim 15, the operations further comprising:

detecting an annotation located at a particular temporal location within the audio data; and wherein integrating the visual data with the audio data to create the augmented content stream comprises overlaying, based on the annotation, the visual data with the audio data at the particular temporal location within the audio data.

17. The non-transitory computer-storage medium of claim 16, wherein the annotation specifies one or more visual data characteristics.

18. The non-transitory computer-storage medium of claim 16, wherein integrating the visual data with the audio data to create the augmented content stream further comprises editing the visual data based on one or more visual data characteristics.

19. The non-transitory computer-storage medium of claim 16, wherein the annotation specifies that visual data cannot be overlaid with the audio data at the particular temporal location.

20. The non-transitory computer-storage medium of claim 15, the operations further comprising:

determining a first context of the audio data based on the textual content of the audio data;

determining a second context of the visual data based on characteristics of the visual data in the searchable database; and determining that the textual content of the audio data matches the characteristics of the visual data in the searchable database based on the first context matching the second context.

21. The method of claim 1, further comprising:

emphasizing portions of the first set of textual content based on audio characteristics other than identification of the first person, wherein selecting, based on a search of a searchable database using the first set of textual content instead of the second set of textual content, visual data in the searchable database based on the first set of the textual content being flagged as being the first speech of the first person in the audio data comprises selecting the visual data based on the emphasized portions of the first set of textual content.

* * * * *